United States Patent
Vollmerhausen

[11] Patent Number: 6,164,401
[45] Date of Patent: *Dec. 26, 2000

[54] GROUND EFFECT SHIP

[76] Inventor: Robert Henry Vollmerhausen, 122 S. Van Buren St., Rockville, Md. 20850

[*] Notice: This patent is subject to a terminal disclaimer.

[21] Appl. No.: 09/390,787

[22] Filed: Sep. 7, 1999

Related U.S. Application Data

[63] Continuation-in-part of application No. 08/811,784, Mar. 6, 1997, abandoned.

[51] Int. Cl.⁷ ........................................................ B60V 1/08
[52] U.S. Cl. ................................................................ 180/119
[58] Field of Search ........................................ 180/116, 117, 180/118, 119, 126

[56] References Cited

U.S. PATENT DOCUMENTS

| | | | |
|---|---|---|---|
| 3,135,480 | 6/1964 | Chaplin, Jr. | 180/116 |
| 3,190,582 | 6/1965 | Lippisch | 180/117 |
| 3,289,977 | 12/1966 | Staats | 180/116 |
| 3,917,022 | 11/1975 | Brooks, Jr. | 180/116 |
| 4,159,086 | 6/1979 | Schonfelder | 244/12.1 |
| 4,712,630 | 12/1987 | Blum | 180/117 |
| 5,335,742 | 8/1994 | Blum | 180/117 |
| 5,566,775 | 10/1996 | Schoell | 180/120 |
| 5,636,702 | 6/1997 | Kolacny | 180/117 |
| 5,697,468 | 12/1997 | Russell, Jr. et al. | 180/116 |

FOREIGN PATENT DOCUMENTS

| | | | |
|---|---|---|---|
| 295652 | 12/1988 | European Pat. Off. | 180/116 |
| 25 53 226 | 11/1975 | Germany | 180/116 |
| 2247216 | 2/1992 | United Kingdom | 180/116 |

*Primary Examiner*—Kevin Hurley

[57] ABSTRACT

The apparatus is a ground effect ship utilizing a wing-hull to support a passenger cabin piggyback style. Each one of the wing-hull segment includes a pontoon member that, in turn, includes a turbine unit of dual use, either compressing water or air, so as to eject a quantity of water or air for generating a coefficient of drag for slowing one part of the apparatus down for maneuving. In a like manner the apparatus includes a plurality of wingvalve elements that draw ambinet air upwardly and conduit that air into a primary airstream so that a coefficient of turbulence induced drag reduces the lift on one wing-hull segment of the apparatus with the result that the apparatus biases a pontoon on the water while elevating another pontoon into the air, substantially parallel with the water's surface. This mode of operation is sailing-flight.

10 Claims, 12 Drawing Sheets

(MIRROR OPPOSITE SIDE)

FIGURE 12

GROUND EFFECT SHIP

This application is a Continuation-in-part of application Ser. No. 08/811,784, filed Mar. 6, 1997 abandoned.

SUMMARY

A Ground-Effect Ship is disclosed having two modes of operation: A power-flight operational mode wherein all pontoon members are in contact with the water; and, a sailing-flight operational mode wherein one pontoon member is 'flown off' the surface while an on-water pontoon member is in contact with the water. The advantage of this arrangement is that wind sheer is directed (dissipated) back into the water while the apparatus quickly regains directional and rotational equilibrium.

BACKGROUND—FIELD OF INVENTION

This invention discloses a Ground-Effect Ship having two modes of travel: first, with a plurality of pontoon floatation members in contact with the water; and secondly, a sailing-flight mode of travel wherein the apparatus lifts at least one pontoon member free of the water's surface and travels 'skipping' at least one other pontoon member over the water's surface.

The fundamental principle of operation is that, as water is approximately eight hundred times more dense than air, the water itself should be used as an energy sink; that is, to absorb the wind energy impacts against the apparatus. The apparatus, in sailing-flight, rotates about a center of gravity so as to 'shunt' wind energy over onto the on-water pontoon member and to, therefore, displace the on-water pontoon member deeper into the water. Mechanically, the forward motion of the apparatus 'bounces' the pontoon member back to a dynamic waterline. The wind energy, therefore, has then been dissipated into the water itself and the apparatus continues on it's way.

BACKGROUND—DESCRIPTION OF PRIOR ART

None of the prior art, taken singularly or collectively, disclosure an apparatus for operating in a sailing-flight mode of travel; that is, with on-water elements for shunting wind energy away from the apparatus and shunting wind energy into the water itself. All of the prior art disclosure apparatus that, in one form or another, use conventional aerodynamic controls to keep the apparatus in straight and level operation.

In contrast the present invention biases an on-water element in contract with the water, providing a yaw rudder to counteract any coefficient of drag imposed on the on-water pontoon member, and further, providing a positive angle of attack on the on-water element, so that as a wind gust traverses over the apparatus, the on-water element 'dips' and recovers and in 'dipping and recovering' the wind energy is dissipated into the water.

Further, none of the prior art discloses an apparatus with a sail-batten radii curvature so as to redirect wind forces impacing against the apparatus so as to utilize the wind energy as a supplemental source of propulsion; and, so as to reduce the displacement of the on-water pontoon member into the water. Thus, the sail-batten radii curvature reduce the displacement of the on-water pontoon member and that, in turn, increases the speed that the on-water pontton recovers to the dynamic waterline.

OBJECTS AND ADVANTAGES

Accordingly, several objects and advantages of my invention are:

(1) to provide an improved means for diverting ambient wind energy, by deflecting the wind energy directly onto a on-water pontoon member, with the wind energy displacing the pontoon lower in the water, and the bouyancy, and the forward motion of the pontoon member forcing the pontoon back to a dynamic waterline.

(2) A second object and advantage of the invention is to generate a differential set of lifting values on each one of the wing-hull segments. By generating lift differential one wing hull segment is disposed into the air; and, the other wing hull segment is disposed downwardly with a respective pontoon biased against the water, so that the apparatus operates in a sailing-flight mode of travel.

(3) A third object and advantage of the invention is to provide an improved pontoon hydroski-centerboard element such that, as at least one pontoon member is downwardly displaced into the water, the hydroski-centerboard exert a a force so as to stabilize the apparatus against lateral movement (slippage) through the water.

(4) A fourth object and advantage of the invention is to provide a means for yaw and pitch control that is disposed in line with a propulsion engine such that, as the on-water pontoon generates a component of frictional drag in response to the apparatus rotating in a prevailing wind, the yaw and pitch control mechanism deflects the airflow through a venturi member so as to trim the apparatus for straight and level operation.

(5) A fifth object and advantage of the invention is to provide a method of apparatus control that utilizes the on-water pontoon member so as to maneuver the apparatus in turns.

(6) A sixth object and advantage of the invention is to provide a means for leveling the passenger cabin in a turning maneuver so as to rotate the passenger cabin into the turn so that the occupants are comfortable through the turning maneuver.

Still further objects and advantages will become apparent from a consideration of the ensuing description and accompanying drawings.

PREFERRED EMBODIMENT—DESCRIPTION

Figure 1:
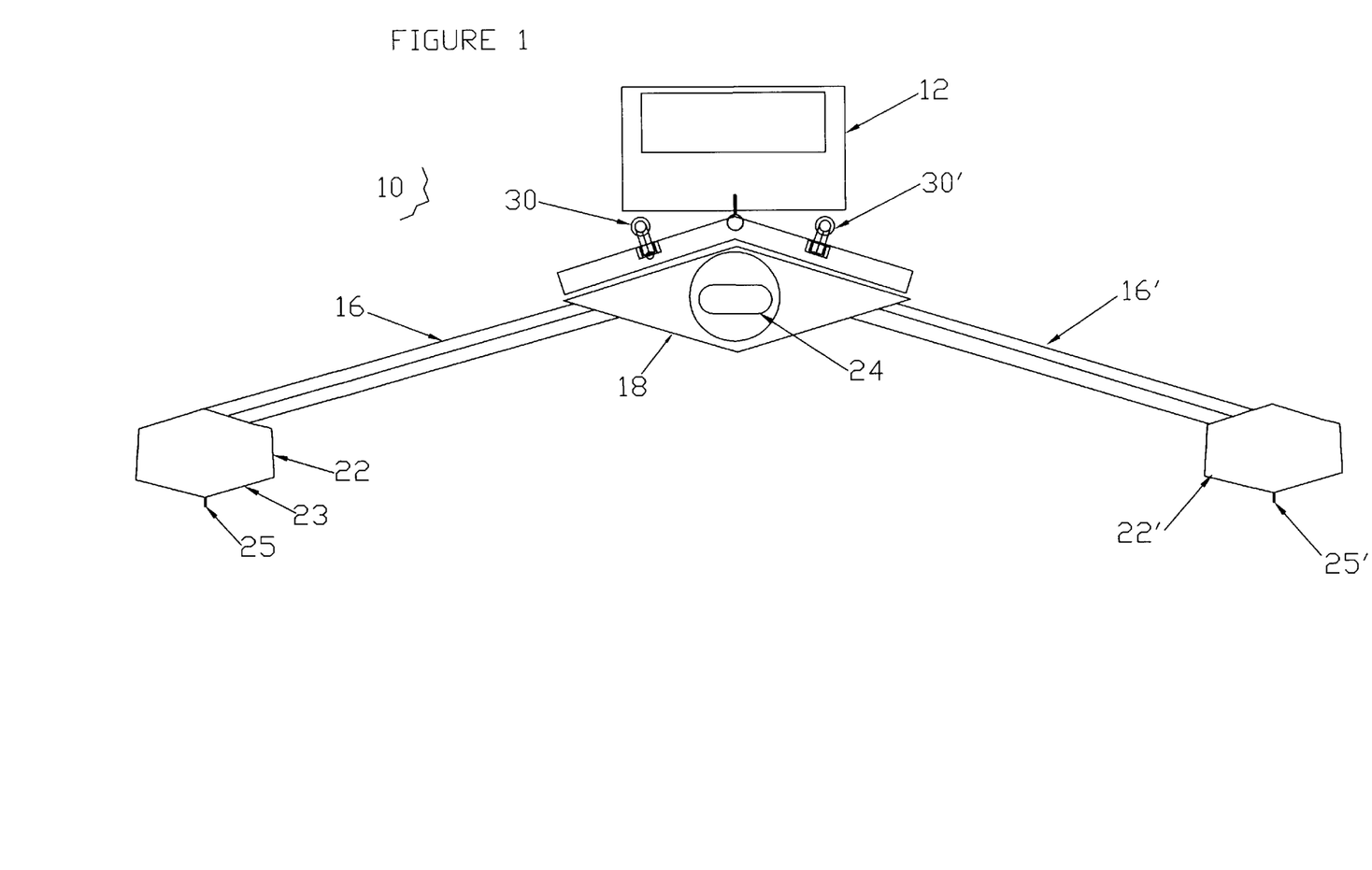
FIG. 1 is a front view of the apparatus that illustrates a passenger cabin disposed above a wing-hull; and, further illustrates a plurality of pontoon members disposed to the outer reaches of the wing-hull
Figure 2:
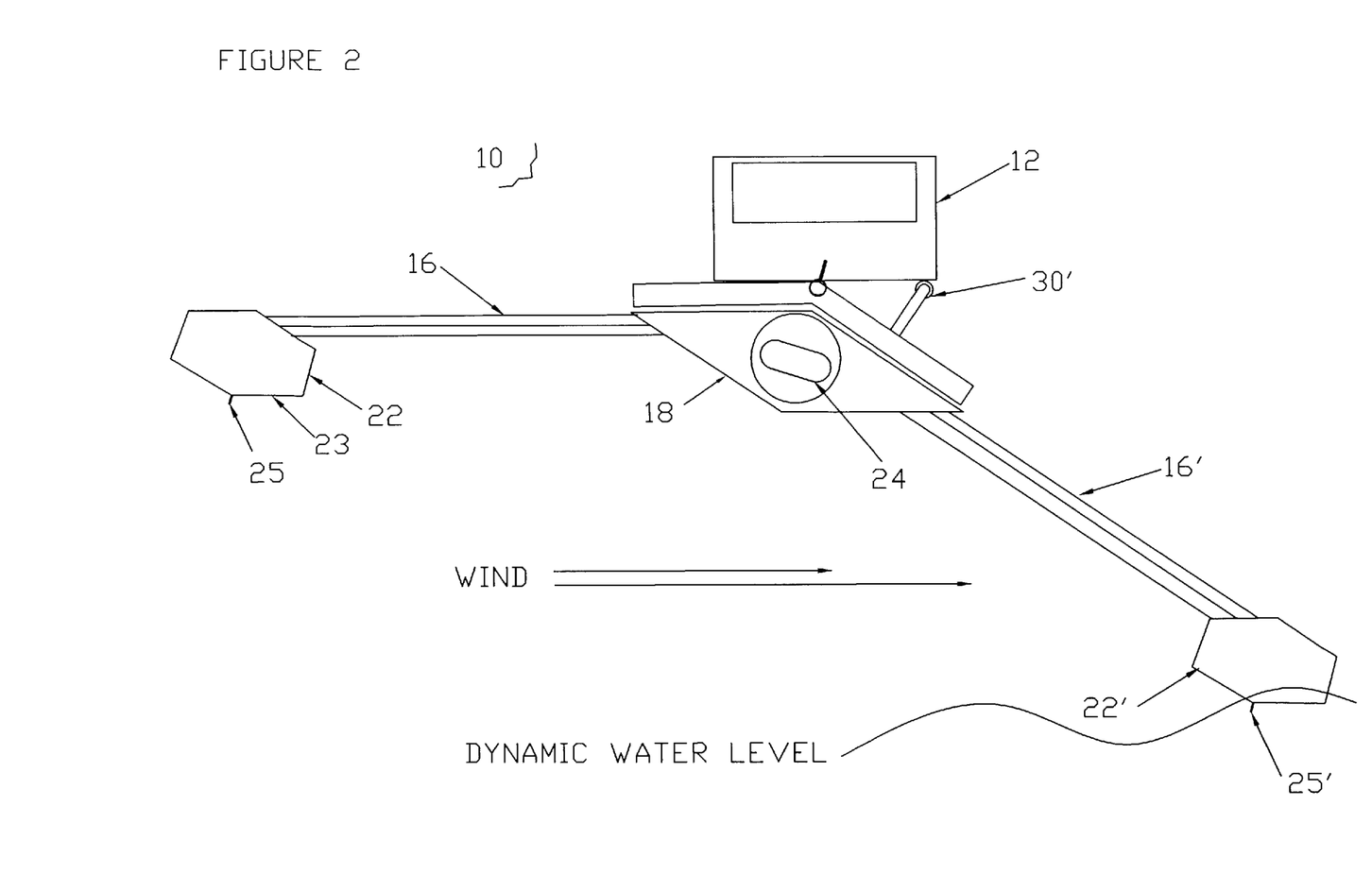
FIG. 2 is a front view of the apparatus in sailing-flight.
Figure 3:
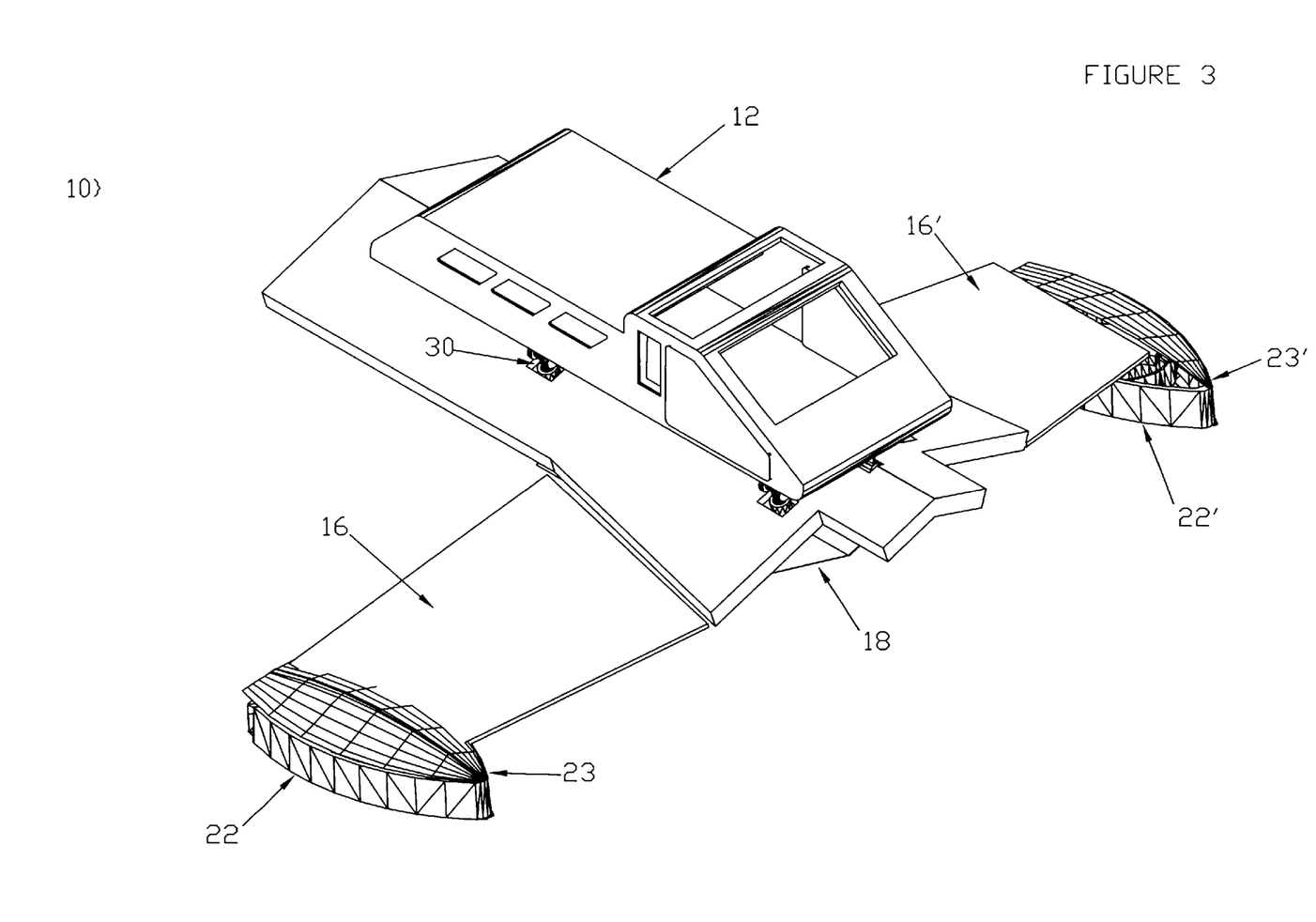
FIG. 3 is a perspective view of the apparatus in use.

Referring now to the drawing wherein like numerals represent like elements throughout it will be apparent in FIGS. 1, 2 and 3, that the Ground Effect Ship (10) includes:

a wing-hull;

the wing-hull including at least two wing-hull segments (16/16') depending downwardly from a longitudinal axis of wing-hull bifurcation;

at least two pontoon members (22/22'), the pontoon members disposed to the outer reaches of the wing-hull segments;

a passenger cabin (12), the passenger cabin disposed above and substantially centered over the wing-hull longitudinal axis of bifurcation;

a venturi member (18), the venturi member depending from the wing-hull, the venturi member including a engine, a means for airflow pressure drop, and a yaw rudder element.

Figure 8:
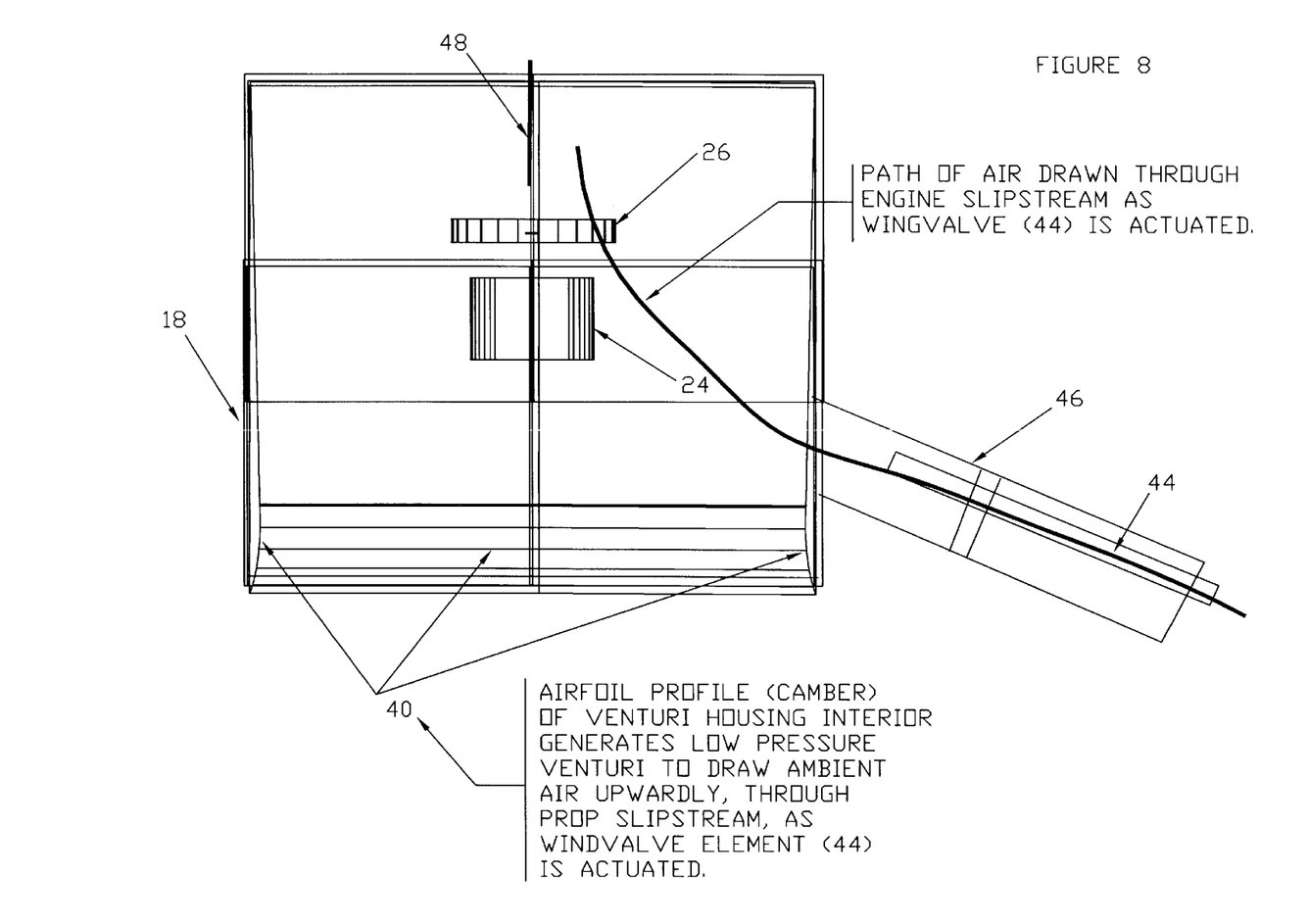
FIG. 8 is a detail view that illustrates the 'in-line' arrangement of the operating propulsion elements: the engine disposed along a centerline of the venturi member, a yaw rudder behind the engine.

Venturi member (18) is a housing for the engine (24), propeller (26), yaw rudder (48) and airfoil camber surface (40) as shown best in FIG. 8, and venturi member bifurcation (20), as shown in FIG. 2.

Each one of the wing-hull segments (16/16') including at least one wingvalve element, (44); each one of the wing-hull segments including at least one conduit element (46); each one of the wingvalve elements (44) disposed within a conduit element (46), each one of the conduit elements extending from the wingvalve element to the venturi member (18).

As a wingvalve element actuates a coefficient of airflow turbulence is generated under at least one wing-hull segment; the coefficient of airflow turbulence generates a coefficient of negative lift on the wing-hull segment so that at least one pontoon member, attached to the outer reaches of the wing-hull segment, drop down to and is biased against the water's surface; and, as at least one pontoon member is biased against the water's surface a coefficient of drag is induced on the pontoon member.

As the coefficient of drag is induced on the pontoon member the yaw rudder is actuated to deflect airflow off of the engine's propeller (26) so as to trim the Ground-Effect Ship in sailing-flight operation.

FIG. 1 is a front view that illustrates the apparatus on floatation pontoon members (22/22') disposed to the outer reaches of the wing hull (16/16'). Venturi member (18) structurally supports the negative diheral wing-hull configuration. Engine (24) is disposed substantially centered within venturi member (18). Yaw rudder element (48) is also in-line with engine (24).

Yaw rudder (48) is vertical or "straight up and down" within venturi member (18) as the Ground-Effect Ship is at rest on a plurality of pontoon member; however, as the Ground-Effect Ship rotates into sailing-flight operation the yaw rudder element is disposed to an acute angle from the vertical such that there is a vertical and hortizontal component of thrust from propwash airflows that are deflected by the yaw rudder.

Hydraulic actuators (30/30') level the passenger cabin (12) in the roll axis as the apparatus (10) is in operation. FIG. 2 illustrates the apparatus in sailing-flight with the passenger cabibn (12) substantially leveled over an in-air (elevated) wing hull segment (16).

FIG. 3 illustrates the bifurcated wing-hull extended outwardly with the pontoon members (22/22')at the outer reaches of the wing hull ;and further, illustrates the negative dihedral angle of the two intersecting wing-hull segment planes,l and that the passenger cabin (12) rests on the top of the wing-hull bifurcation longitudinal axis.

Figure 4:
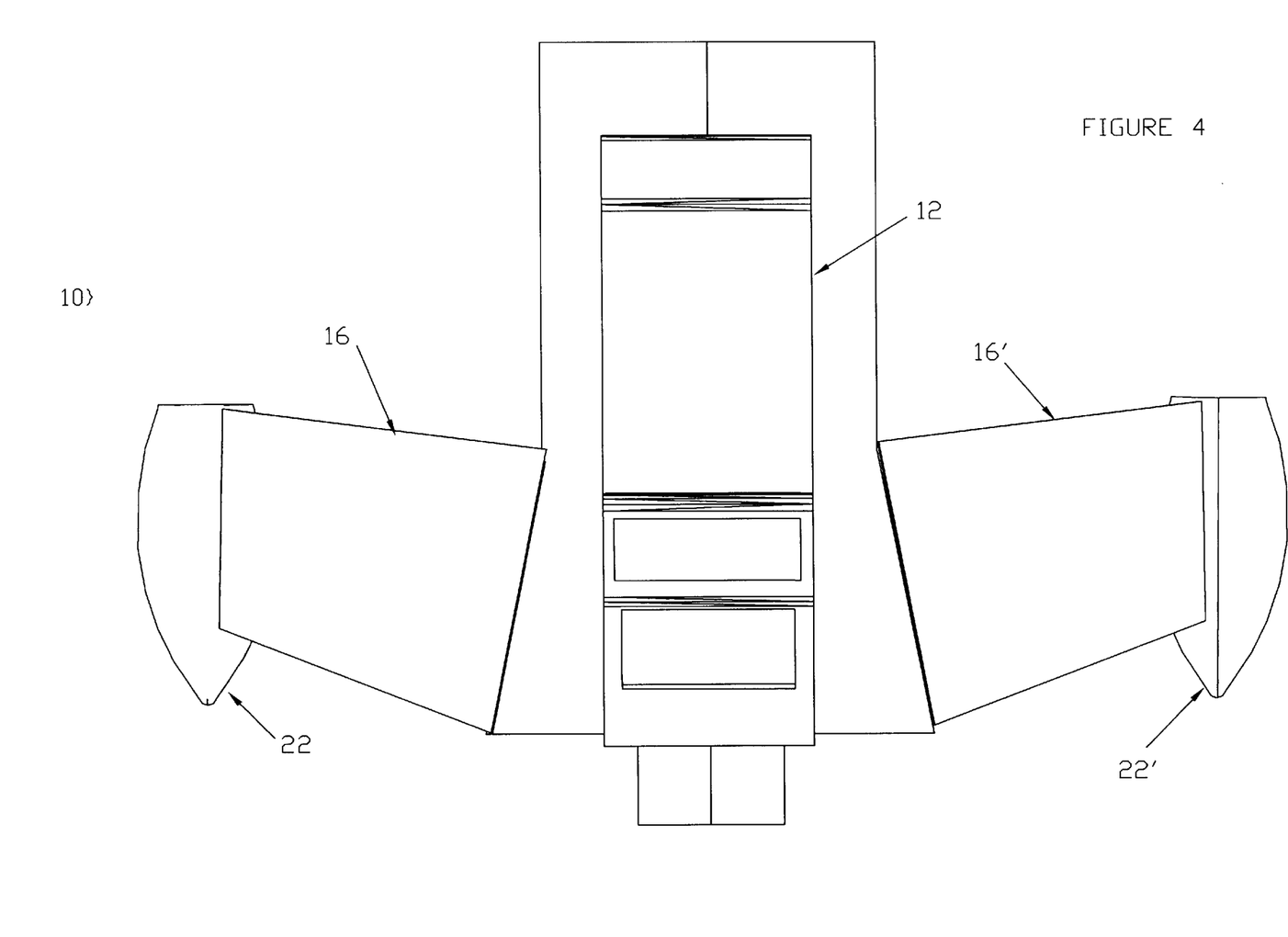
FIG. 4 is a top view of the apparatus.

FIG. 4 is a top view illustrating the substantially centered distribution of weight of the passenger cabin (12) over the wing-hull. The center of gravity of the ground-effect ship is centered longitudinally over the bifurcated wing-hull. The center of gravity is likewise substantially centered, in the pitch axis, over the wing-hull. The negative aspect ratio of the wing-hull, the enlongated extension of the bifurcated wing-hull coordinates airflow under the apparatus, stabilizing it in sailing-flight operation.

Figure 5:
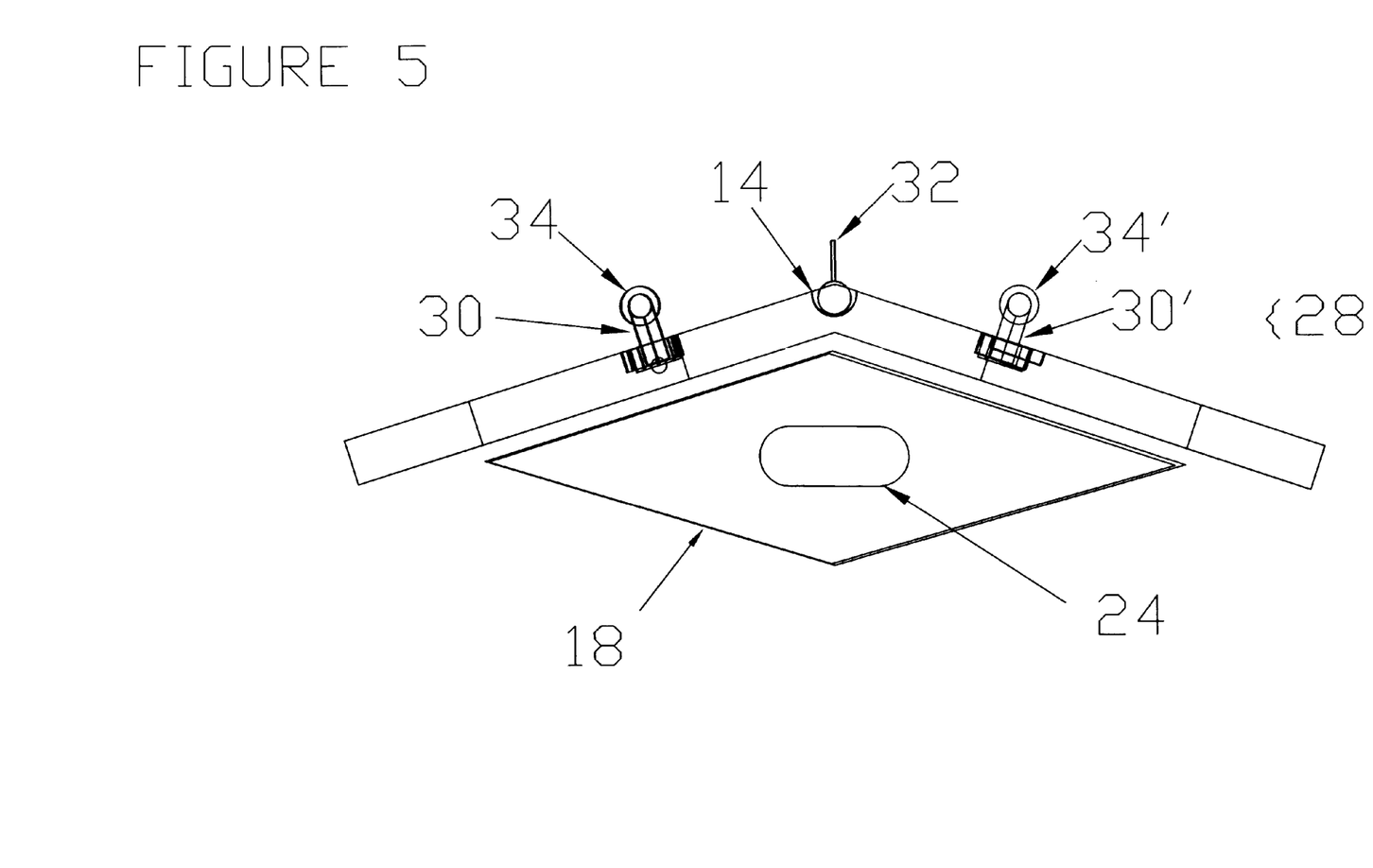
FIG. 5 is a detail view that illustrates the wing-hull mounted hydraulic actuators for leveling the passenger cabin over the wing-hull.

FIG. 5 schematically illustrates the symmetery of the venturi member (18), with the starboard and port halves of the venturi member (18) substantially a mirror image of the other.

FIG. 5 illustrates a means for leveling (28) that includes pivot mount element (32). Pivot mount element (32) is a structural extension of rotating bearing element (14). As apparatus (10) increases speed the apparatus operates in a sailing-flight mode of operation, as is more fully explained and claimed hereinafter, so as to elevate at least one wing-hull segment upwardly to fly substantially parallel with the water's surface.

Roller elements (34/34'), disposed to the terminal ends of the hydraulic actuators (30), bias against the undercarriage of passenger cabin (12) as hydraulic actuators (30) extend. Roller elements (34/34') smoothing out the leveling actionas actuators (30) extend.

Figure 6:
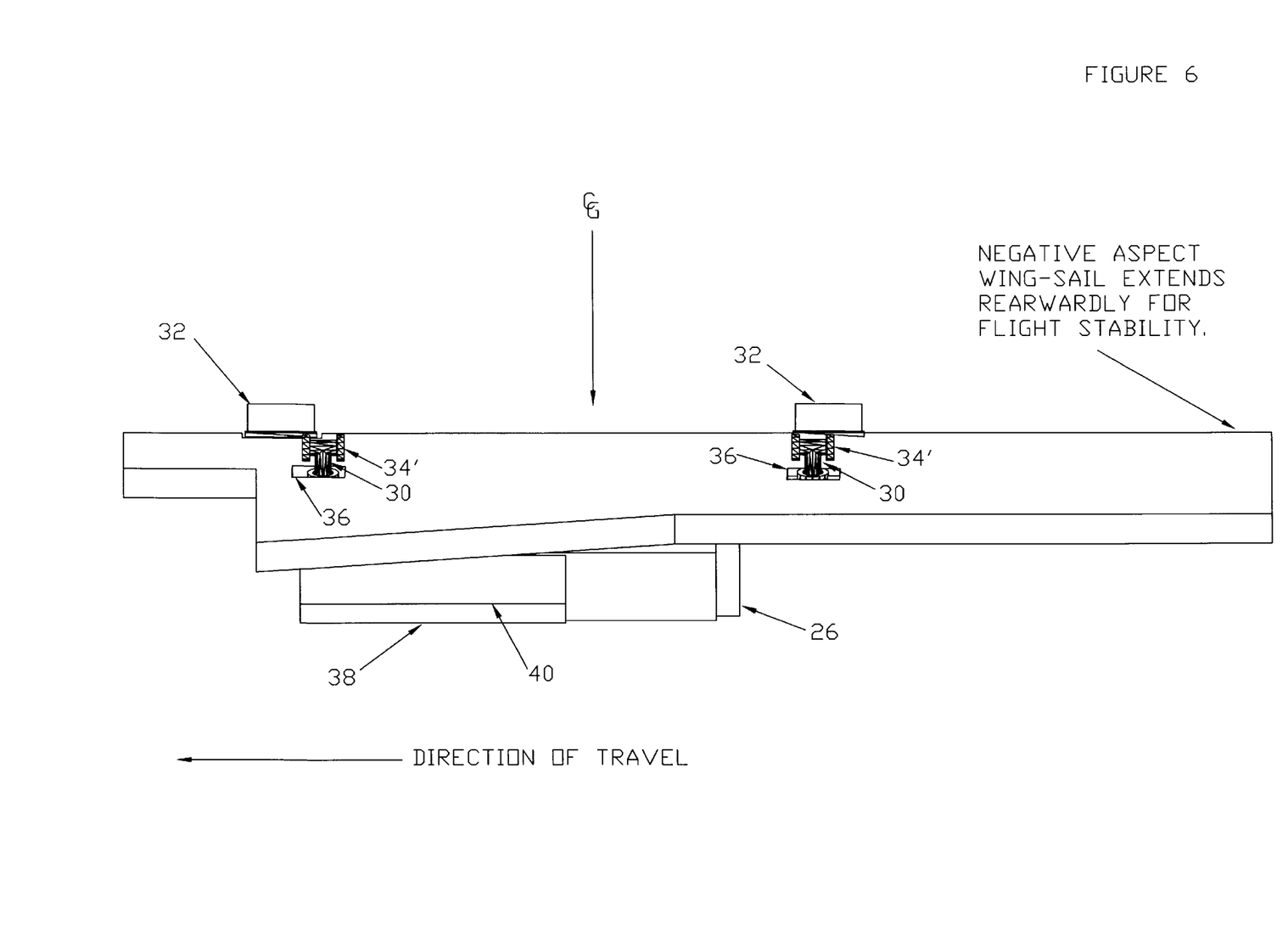
FIG. 6 is a side view of the wing-hull illustrating the placement of hydraulic actuators for longitudinal leveling (in the roll axis) of the passenger cabin over the wing-hull.

FIG. 6 illustrates the enlongated wing-hull with a plurality of recess housing elements (36) arrayed in a front to rear arrangement so as to recess and extend hydraulic actuators (30) as the ground-effect ship increases speed to sailing-flight. FIG. 6 also shows reinforcement rib (38) extending the fore to aft length of venturi member (18).

Figure 7:
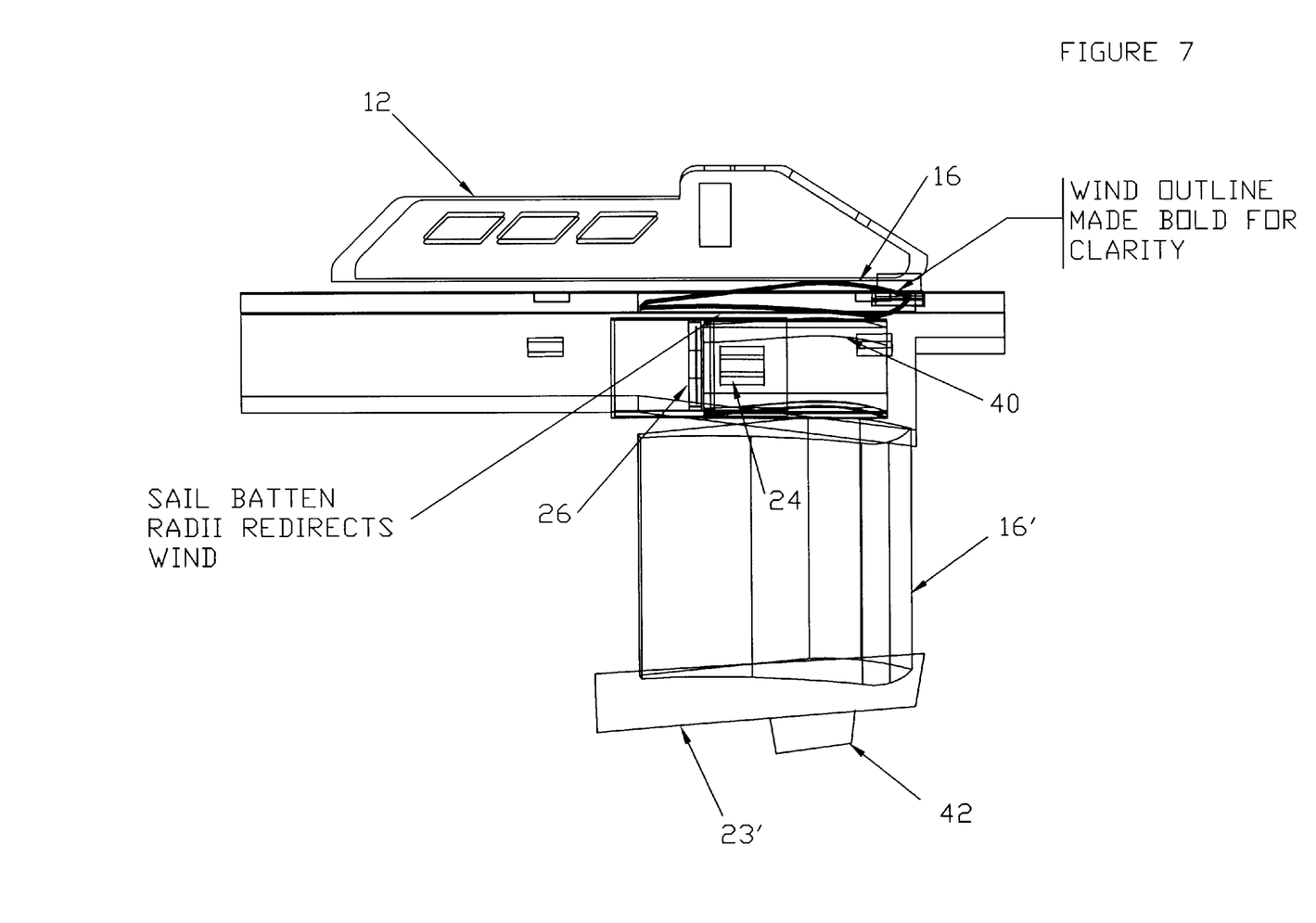
FIG. 7 is a side view of the apparatus that illustrates a sail-batten radii concavity defined within each one of the wing-hull segments.

FIG. 7 is a cutaway view illustrating a sail-batten radii curvature in each one of the wing-hull segments (16/16') and further shows the in-line arrangement of the engine, the propeller (26) and that engine (24) is located at approximately the center of gravity of the apparautus, and is located aft of the point of highest camber of airfoil camber surface (40).

FIG. 8 shows the interior arrangement of the elements of the venturi member (18). Wingvalve elements (44) actuate to admit ambient air into conduit element (46). The drop in airflow pressure within venturi member (18) induces an airflow through conduit element (46) into venturi member (18), into the propwash airflow, past yaw rudder (48) and exhausting the airflow aft of the apparatus (10).

Figure 9:
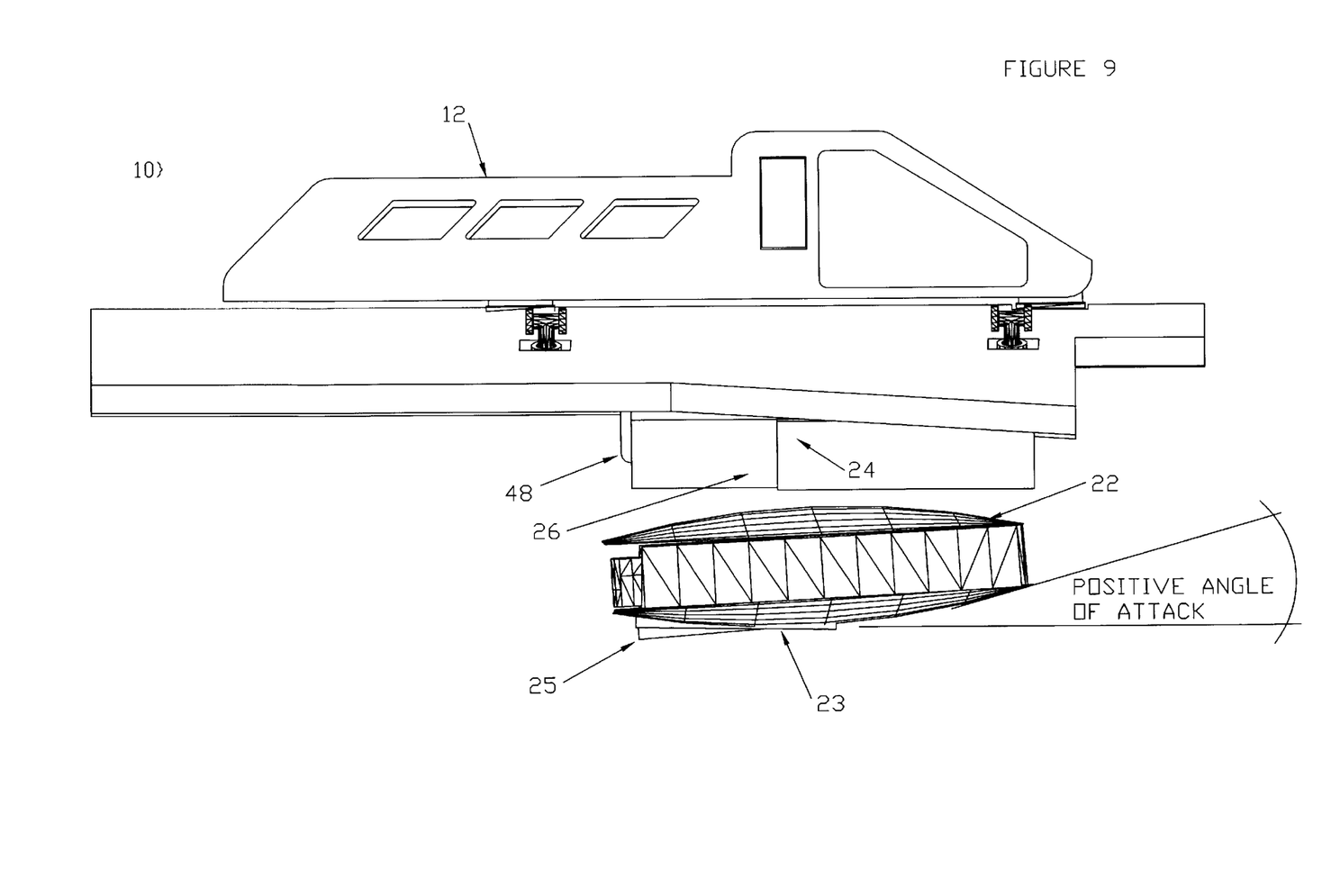
FIG. 9 is a side view of the apparatus showing a pontoon member disposed to the outer reach of the wing-hull and further illustrating the positive angle of attack of the pontoon with respect to the line of travel.

FIG. 9 illustrates a side view of the ground-effect ship (10) showing the in-line arrangement of elements, engine (24), propeller (26), and yaw rudder (48) and the arrangement of the engine, prop and yaw rudder with a pontoon element (22). FIG. 9 also illustrates the arrangement of the elements (engine, prop, yaw rudder and pontoon (22) as forward of the englongated wing-hull. It further illustrates a positive angle of attack on the pontoon member (22).

Figure 10:
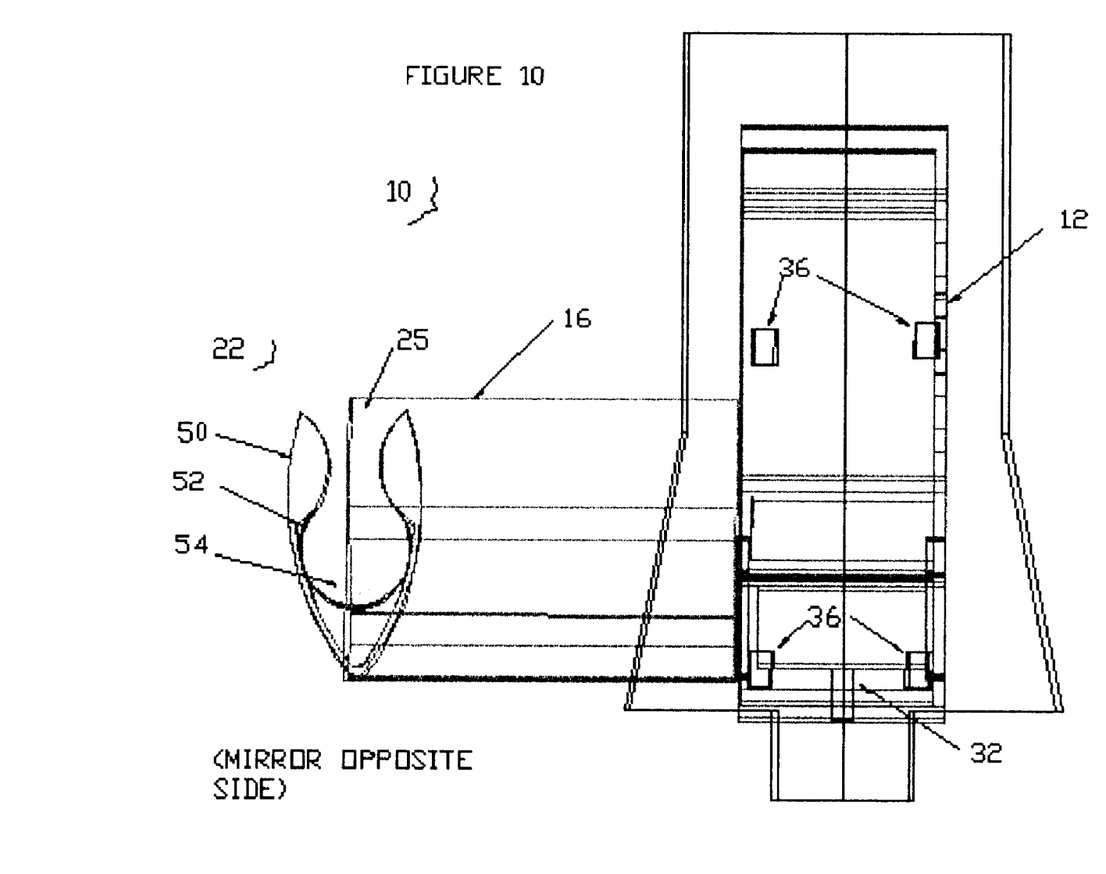
FIG. 10 is a top parial view of the apparatus that illustrates the operating element of each one of the pontoon members and further illustrates the convex interior of each one of the pontoon members.
Figure 11:
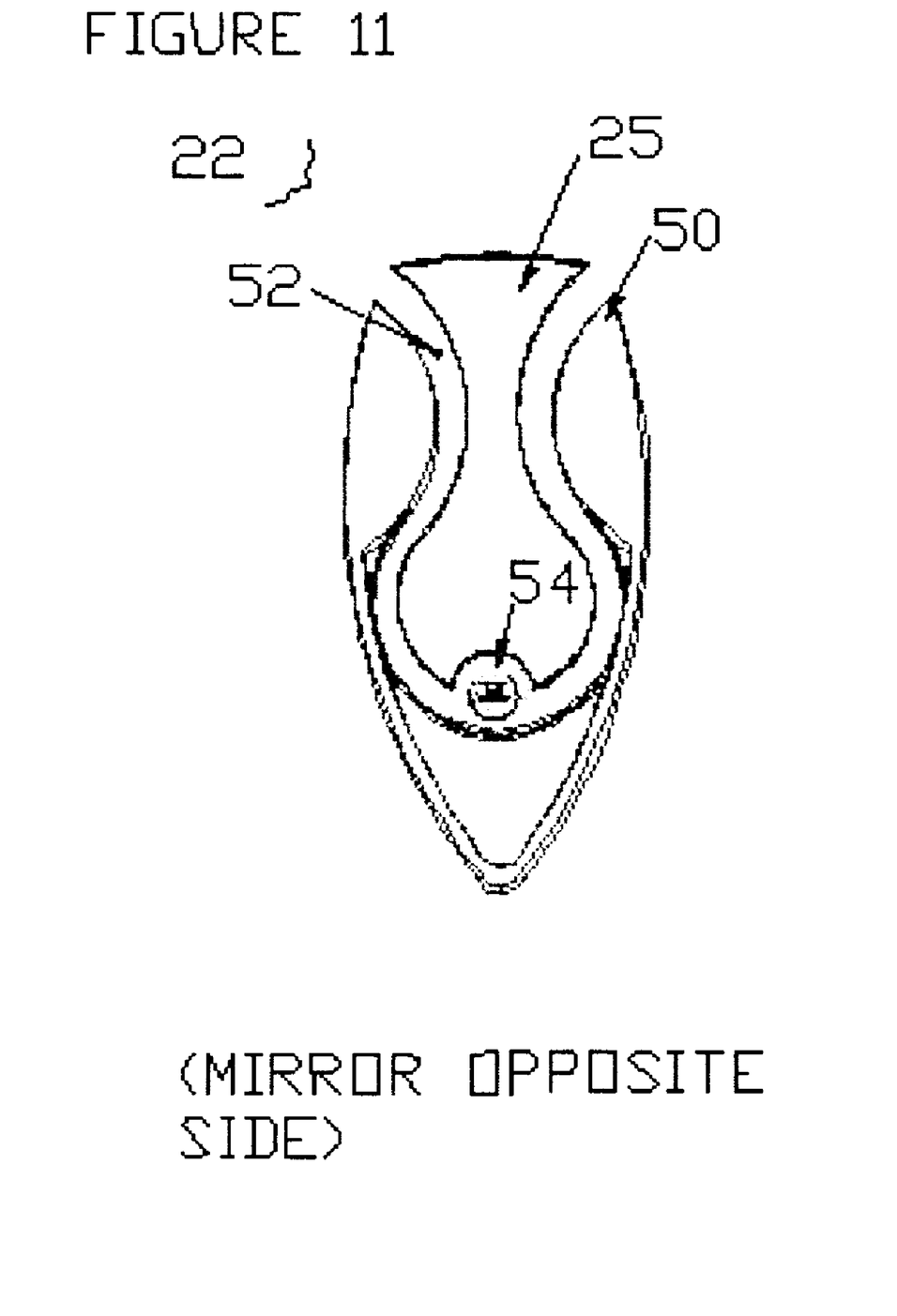
FIG. 11 is a cutaway view of the top of a pontoon member illustrating the arrangement of elements within the pontoon member.
Figure 12:
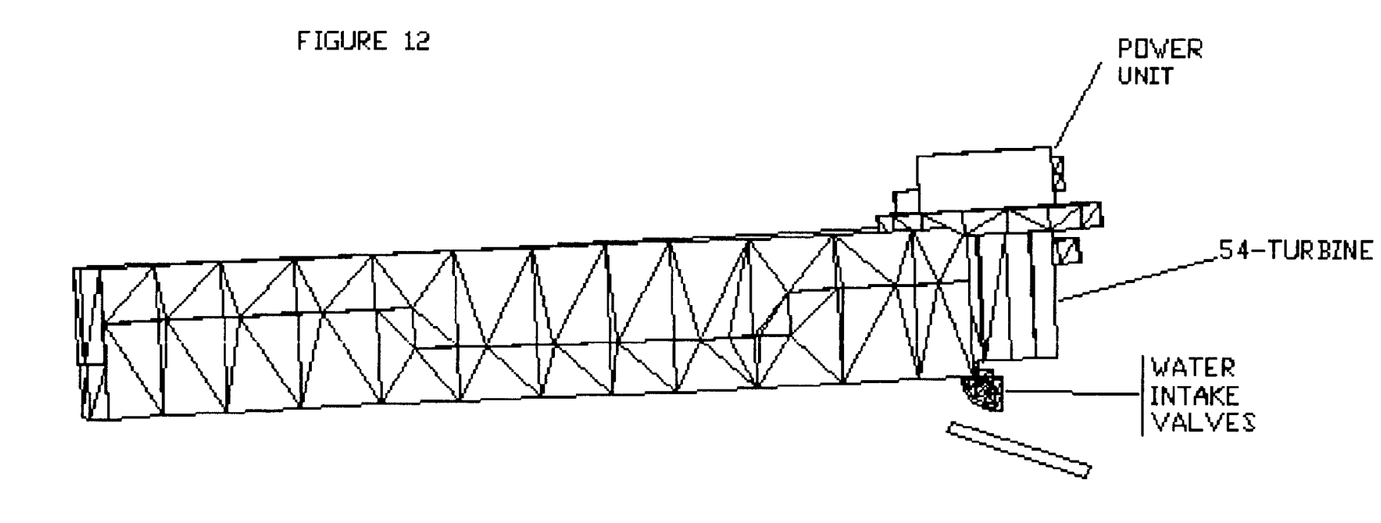
FIG. 12 is a detail view of the pontoon member that illustrates a water deflector element, a water intake port, a turbine member, and a power unit element disposed with in pontoon member.

FIGS. 10 and 11 are plan views that illustrates the arrangement of operating elements within each one of the pontoon members (22/22'). FIG. 11 illustrates a turbine member (54). Deflector (50) forces water upwardly into channel element (52). FIG. 12 is a schematic view showing a water intake valve that feeds water upward to the turbine (54), or conversely feeds ambient air into turbine (54).

PREFERRED EMBODIMENT—OPERATION

To level the passenger cabin (12) hydraulic actuators (30/30') are actuated, as shown best in FIGS. 2 and 5. Roller elements (34/34') as shown in FIG. 5 bias upwardly against the lower portion of passenger cabin (12) rotating the passenger cabin (12) through an arc of rotation with rotating bearing (14) limiting the movement of passenger cabin (12) to an arc of rotation in the longitudinal (roll) axis. Passenger cabin (12) is mounted over pivot mount element (32) so that passenger cabin (12) is leveled with the elevated wing-hull segment.

FIG. 6 illustrates a plurality of hydraulic actuators disposed along the fore to aft length of the wing -hull so as to distribute the force exerted by the hydraulic actuator rams along the length of passenger cabin (12). Recess element (36), as shown in FIG. 6, is a housing element for the retraction of hydraulic actuators when not in use.

FIG. 6 also illustrates the rearward extension of the wing-hull. This readward extension can be likened to the flight feathers on an arrow functioning so as to orient the wing-hull with the airflow under the apparatus.

FIG. 7 illustrates the downwardly depending wing-hull segment and further illustrates the elevated wing-hull segment with a note calling out a concave design element in the under surface of each one of the wing-hull segments. This concave design element is a sail batten radii that function to redirect a transverse (sheering) wing from lifting the on-water pontoon (22' in FIG. 7). As the sail batten radii redirects wing sheer rearwardly of the apparatus, the added wing energy is a component of thrust that partially compensates for the coefficient of drag on the on-water pontoon. Redirecting this wing energy assists the operational equibilium of the apparatus.

Further, as will be apparent from FIGS. 1, 2, and 3, the center-of-gravity is aligned with the longitudinal centerline of the wing-hull so that, as a potentially upending wind strikes the apparatus, force of the wind pivots the apparatus through the center-of-gravity. The apparatus is then likened to a child's see-saw with the pivot (rotational) point in the center so that as one wing-hull segment is elevated, the other wing-hull segment is rotated downwardly onto the water's surface.

As water is approximately eight hundred times more dense than air, as wind strikes the apparatus, the longitudinal rotation of the apparatus depresses the on-water pontoon deeper into the water. The floatation and positive angle of attack of the on-water pontton hydroski (23/23') forces the on-water pontoon back to the surface. The result is that the energy of the wind has been disappitated into the water. The water itself is an 'energy sink.' FIG. 7 further illutrates propeller (26) in-line behind engine (24) within venturi member (18). FIG. 8 illustrates one of a plurality of wingvalve elements (44) that when actuated draw undercarriage ambient air upwardly into conduit element (46).

Conduit element (46) is an open air conduit that communicates directly with the interior of venturi member (18). In FIG. 8 a dashed line indicates the path of ambient air taken from under the apparatus and routed through conduit element (46) into the interior of venturi member (18). Airfoil (cambered) surface (40) increases the velocity of ambient air drawn through the well-known venturi effect wherby a drop of atmospheric pressure results from an increase in the velocity of air through a constriction. It is this drop of atmospheric pressure in combination with the airflow pressure resulting from the weight of the apparatus on the ground-effect (generating a compression effect on the air under the apparatus) that induces air through the wingvalve (44), through conduit element (46) and thence outwardly, past engine and propeller (24 and 26), to be esxhausted behind the apparatus.

Drawing air upwardly through wingvalve (44) creates an airflow turbulence that generates a coefficient of drag (vertices of drag) downwind of the wingvalve (44). The generation of the vertices results in a reduction of the coefficient of lift with the result that the on-water pontoon moves down to the surface of the water. By opening and closing one or more wingvalve elements (44) the weight on the water can be controlled; however, the on-water pontoon itself still generates a component of drag.

To trim the apparatus a yaw-rudder element (48), as shown in FIG. 9, is disposed behind the engine's propeller (26) and deflects propwash airflow so as to generate a counter-balancing force to the drag imposed by the on-water pontoon (22'). As shown best in FIG. 11, each one of the pontoon members includes an air rudder member (50/52) .Deflector element (50) redirects the pressurized water so that as the water exits the channel element (52) (port or starboard depending on turbine direction) the ejected water generates a coefficient of drag about the pontoon that slows the pontoon down in the water. So that, if a turn is to be made using the on-water pontoon as a pivot point, the on-water pontoon is slowed down causing the apparatus to 'swing' about, making it's turn, However, if the turn is to be made in the direction of the in-air pontoon, then turbine (54) in the in-air pontoon forces high pressure air through channel element (52) so as to generate a coefficient of turbulence that lowers the in-air wing-hull segment, causing the apparatus to maneuver into a turn.

CONCLUSIONS, RAMIFICATIONS, AND SCOPE

Accordingly, it can be seen that the the elements of the invention work cooperatively to achieve the objects and advantages as set forth.

Although the description above contains many specificities, these should not be construed as limiting the scope of the invention but as merely providing illustrations of some of the presently preferred embodiments of this invention. Various other embodiments and ramifications are possible within it's scope.

Thus the scope of the invention should be determined by the appended claims and their legal equivalents, rather than by the examples given.

What is claimed is:

1. A Ground-Effect Ship wherein at least one pontoon member is biased against the water's surface as the Ground-Effect Ship is in sailing-flight operation, comprising:
   a wing-hull,
   the wing-hull including at least two wing-hull segments, at least one of the wing-hull segments depending downwardly from a longitudinal axis of wing-hull bifurcation,
   at least two pontoon members, the pontoon members disposed to the outer reaches of the wing-hull segments,
   a passenger cabin, the passenger cabin disposed above and substantially centered over the wing-hull longitudinal axis of bifurcation, a venturi member, the venturi member depending from the wing-hull, the venturi member including a engine, a means for airflow pressure drop, and a yaw rudder element, each one of the wing-hull segments including at least one wingvalve element disposed within a conduit element, each one of the conduit elements extending from the wingvalve element to the venturi member, as a wingvalve element actuates a coefficient of airflow turbulence is generated under at least one wing-hull segment, the coefficient of airflow turbulence generates a coefficient of negative lift on the wing-hull segment so that at least one pontoon member, attached to the outer reaches of the wing-hull segment, drop down to and is biased against the water's surface, as at least one pontoon member is biased against the water's surface a coefficient of drag is induced on the pontoom member, and, as the coefficient of drag is induced on the pontoon member the yaw rudder is actuated to deflect airflow off of the engine's propeller so as to trim the Ground-Effect Ship in sailing-flight operation.

2. A Ground-Effect Ship as recited in claim 1 wherein the Ground-Effect Ship includes a means for leveling whereby as the Ground-Effect Ship is operational in sailing-flight the passenger cabin is rotated level with an elevated wing-hull segment.

3. A Ground-Effect Ship as recited in claim 1 wherein the means for airflow pressure drop includes a plurality of airfoil cambered surfaces, the plurality of airfoil cambered surfaces disposed normal to an airflow entering the venturi member whereby a drop in airflow pressure is generated as the engine draws air through the venturi member.

4. A Ground-Effect Ship as recited in claim 1 wherein each one of the pontoon members includes a deflector element, a channel element, and a turbine unit, whereby as water enters the pontoon member a coefficient of turbulence is generated to slow the pontoon member as the apparatus is making a turn.

5. A Ground-Effect Ship as recited in claim 4 wherein the turbine unit intakes ambient air whereby, as a turning maneuver is actuated, the in-air pontoon member turbine intakes air so as to generate a coefficient of turbulence whereby the apparatus maneuvers into a turn.

6. A Ground-Effect Ship as recited in claim 1 wherein each one of the pontoon members includes a centerboard element, a hydroski element, whereby as the apparatus is in sailing-flight, the centerboard element and the hydroski element track the apparatus through the water at a dynamic waterline.

7. A Ground-Effect Ship as recited in claim 1 wherein each one of the pontoon members defines a postive angle of attack with the water whereby as a wind sheer displace the apparatus about it's longitudinal axis, and as such rotation about the longitudinal axis submerges the on-water pontoon member, the positive angle of attack generates a coefficient of lift to reestablish a dynamic waterline.

8. A Ground-Effect Ship as recited in claim 2 wherein the means for leveling includes a plurality of hydraulic actuators, a plurality of roller elements disposed to the terminal ends of the hydraulic actuators, a pivot element, whereby as the hydraulic actuators extend the passenger cabin is rotated level with an elevated wing-hull segment as the Ground-Effect Ship is in sailing-flight operation.

9. A Ground-Effect Ship as recited in claim 1 wherein the wing-hull defines a negative dihedral angle at a longitudinal axis of bifurcation, each one of the wing-hull segments depends downwardly from the longitudinal axis of bifurcation whereby as the Ground-Effect Ship is in sailing-flight operation, the yaw rudder is rotated through a vertical angle to deflect engine propwash airflow so as to counteract a coefficient of drag on the pontoon member.

10. A Ground-Effect Ship as recited in claim 1 wherein each one of the wing-hull segments includes a sail-batten radii curvature whereby as the apparatus is in sailing-flight, and as a transverse wind rotates the Ground-Effect Ship through the center of gravity, the wind is deflected by the sail-batten radii curvature so as to generate a coefficient of forward thrust.

* * * * *